United States Patent
Takeda et al.

(10) Patent No.: US 10,061,096 B2
(45) Date of Patent: Aug. 28, 2018

(54) OPTICAL CABLE

(71) Applicant: FUJIKURA LTD., Tokyo (JP)

(72) Inventors: Daiki Takeda, Sakura (JP); Tomoaki Kaji, Sakura (JP); Satoru Shiobara, Sakura (JP); Masayoshi Yamanaka, Sakura (JP); Naoki Okada, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/116,889

(22) PCT Filed: Oct. 3, 2014

(86) PCT No.: PCT/JP2014/076502
§ 371 (c)(1),
(2) Date: Aug. 5, 2016

(87) PCT Pub. No.: WO2015/132996
PCT Pub. Date: Sep. 11, 2015

(65) Prior Publication Data
US 2017/0153404 A1 Jun. 1, 2017

(30) Foreign Application Priority Data
Mar. 6, 2014 (JP) .................... 2014-043622

(51) Int. Cl.
*G02B 6/44* (2006.01)

(52) U.S. Cl.
CPC ........... *G02B 6/4433* (2013.01); *G02B 6/449* (2013.01)

(58) Field of Classification Search
CPC .............................. G02B 6/4433; G02B 6/449
See application file for complete search history.

(56) References Cited

U.S. PATENT DOCUMENTS 4,054,365 A * 10/1977 Marx .................. G02B 6/4403
385/101
4,110,001 A * 8/1978 Olszewski ............. G02B 6/441
385/111

(Continued)

FOREIGN PATENT DOCUMENTS

EP 1061394 A1 12/2000
EP 1245981 A2 10/2002

(Continued)

OTHER PUBLICATIONS

Japanese Office Action of Application No. 2014-043622 dated Nov. 4, 2014.

(Continued)

*Primary Examiner* — Peter Radkowski
(74) *Attorney, Agent, or Firm* — Sughrue Mion, PLLC

(57) ABSTRACT

[Problem] The thickness on a ripcord in a circular optical cable is reduced, to improve workability.
[Solution] An optical cable of the present invention includes: an optical fiber unit including optical fibers; a sheath, having a circular external form, configured to house the optical fiber unit in a housing portion; and two strength members embedded in the sheath; and two rip cords, wherein when a direction of connecting the two strength members sandwiching the housing portion is a first direction and a direction intersecting the first direction is a second direction, in a cross section of the optical cable, a cross-sectional shape of the housing portion has a dimension in the second direction greater than that in the first direction, and the two rip cords is disposed to sandwich the optical fiber unit such that a direction of connecting the two rip cords is in the second direction, in the cross section of the optical cable.

4 Claims, 12 Drawing Sheets

(56) References Cited

U.S. PATENT DOCUMENTS

| | | | | | |
|---|---|---|---|---|---|
| 4,525,702 | A * | 6/1985 | Kitagawa | | E05B 45/005 340/556 |
| 4,707,074 | A * | 11/1987 | Heywood | | G02B 6/4407 385/105 |
| 4,807,962 | A * | 2/1989 | Arroyo | | G02B 6/4407 385/105 |
| 4,836,639 | A * | 6/1989 | Shamoto | | G02B 6/4402 385/109 |
| 4,844,575 | A * | 7/1989 | Kinard | | G02B 6/4426 174/106 D |
| 4,909,592 | A * | 3/1990 | Arroyo | | G02B 6/4433 174/23 C |
| 4,984,869 | A * | 1/1991 | Roche | | G02B 6/4432 385/113 |
| 5,039,195 | A * | 8/1991 | Jenkins | | G02B 6/4416 174/70 R |
| 5,050,957 | A * | 9/1991 | Hamilton | | G02B 6/443 385/113 |
| 5,109,457 | A * | 4/1992 | Panuska | | G02B 6/4415 174/23 R |
| 5,163,116 | A * | 11/1992 | Oestreich | | G02B 6/4403 385/111 |
| 5,469,523 | A * | 11/1995 | Blew | | G02B 6/4403 385/101 |
| 5,509,097 | A * | 4/1996 | Tondi-Resta | | G02B 6/4403 385/109 |
| 5,542,020 | A * | 7/1996 | Horska | | G02B 6/4429 385/100 |
| 5,651,081 | A * | 7/1997 | Blew | | G02B 6/4403 385/101 |
| 5,668,912 | A * | 9/1997 | Keller | | G02B 6/4403 385/100 |
| 5,740,295 | A * | 4/1998 | Kinard | | G02B 6/441 385/103 |
| 5,764,835 | A * | 6/1998 | Rubin | | G02B 6/4415 385/104 |
| 5,960,144 | A * | 9/1999 | Klumps | | G02B 6/4416 385/101 |
| 5,970,196 | A * | 10/1999 | Greveling | | G02B 6/4404 385/100 |
| 5,982,966 | A * | 11/1999 | Bonicel | | G02B 6/4402 385/100 |
| 5,999,676 | A * | 12/1999 | Hwang | | G02B 6/4407 385/103 |
| 6,041,153 | A * | 3/2000 | Yang | | B29C 47/0023 385/100 |
| 6,137,936 | A * | 10/2000 | Fitz | | G02B 6/4422 385/100 |
| 6,198,865 | B1 * | 3/2001 | Risch | | G02B 6/4433 385/100 |
| 6,241,920 | B1 * | 6/2001 | Cotter | | G02B 6/4416 264/1.24 |
| 6,249,629 | B1 * | 6/2001 | Bringuier | | G02B 6/4433 385/101 |
| 6,314,224 | B1 * | 11/2001 | Stevens | | G02B 6/4426 385/113 |
| 6,343,172 | B1 * | 1/2002 | Schiestle | | G02B 6/4416 385/101 |
| 6,377,738 | B1 * | 4/2002 | Anderson | | G02B 6/4433 385/100 |
| 6,430,344 | B1 * | 8/2002 | Dixon | | G02B 6/443 385/109 |
| 6,519,396 | B2 * | 2/2003 | Schneider | | G02B 6/4419 174/70 R |
| 6,606,436 | B2 | 8/2003 | Logan et al. | | |
| 6,618,526 | B2 * | 9/2003 | Jackman | | G02B 6/4429 385/100 |
| 6,687,437 | B1 * | 2/2004 | Starnes | | G02B 6/4416 174/113 R |
| 6,704,482 | B2 * | 3/2004 | Okada | | G02B 6/4495 385/111 |
| 6,738,547 | B2 * | 5/2004 | Spooner | | G02B 6/4416 385/101 |
| 7,113,680 | B2 * | 9/2006 | Hurley | | G02B 6/441 385/112 |
| 7,197,215 | B2 * | 3/2007 | Baird | | G02B 6/4495 385/100 |
| 7,289,704 | B1 * | 10/2007 | Wagman | | G02B 6/4429 385/100 |
| 7,397,992 | B1 * | 7/2008 | Blazer | | G02B 6/4433 385/106 |
| 7,454,106 | B2 * | 11/2008 | Cobb, III | | G02B 6/4475 385/100 |
| 7,627,218 | B2 * | 12/2009 | Hurley | | G02B 6/4457 385/100 |
| 7,646,954 | B2 * | 1/2010 | Tatat | | G02B 6/4433 385/103 |
| 7,778,510 | B2 * | 8/2010 | Aronson | | G02B 6/4292 385/100 |
| 7,787,727 | B2 * | 8/2010 | Bringuier | | G02B 6/02357 385/100 |
| 7,920,764 | B2 * | 4/2011 | Kewitsch | | G02B 6/447 340/572.7 |
| 8,175,433 | B2 * | 5/2012 | Caldwell | | G02B 6/4433 264/1.29 |
| 8,280,209 | B2 * | 10/2012 | Bollinger, Jr. | | G02B 6/4459 385/106 |
| 8,520,992 | B2 * | 8/2013 | Osato | | G02B 6/4429 385/100 |
| 8,676,012 | B2 * | 3/2014 | Bradley | | G02B 6/4433 385/113 |
| 8,693,831 | B2 * | 4/2014 | Register, III | | G02B 6/4433 385/101 |
| 8,885,999 | B2 * | 11/2014 | Roberts | | H01B 11/22 385/101 |
| 9,075,211 | B2 * | 7/2015 | Register, III | | G02B 6/4433 |
| 9,209,510 | B2 * | 12/2015 | Moe | | H01P 3/06 |
| 9,419,321 | B2 * | 8/2016 | Vaccaro | | H01P 3/06 |
| 9,423,583 | B2 * | 8/2016 | Register, III | | H01B 11/22 |
| 2002/0041743 | A1 * | 4/2002 | Schneider | | G02B 6/4419 385/101 |
| 2002/0044751 | A1 | 4/2002 | Logan et al. | | |
| 2002/0126967 | A1 * | 9/2002 | Panak | | G02B 6/4405 385/101 |
| 2002/0141713 | A1 * | 10/2002 | Okada | | G02B 6/4495 385/113 |
| 2002/0159727 | A1 * | 10/2002 | Okada | | G02B 6/4495 385/109 |
| 2003/0072545 | A1 * | 4/2003 | Kusakari | | G02B 6/4432 385/101 |
| 2003/0118298 | A1 * | 6/2003 | Matsuyama | | G02B 6/443 385/110 |
| 2006/0127016 | A1 * | 6/2006 | Baird | | G02B 6/4495 385/113 |
| 2006/0140557 | A1 * | 6/2006 | Parris | | G02B 6/4429 385/113 |
| 2006/0291787 | A1 * | 12/2006 | Seddon | | G02B 6/4433 385/113 |
| 2008/0037942 | A1 * | 2/2008 | Tatat | | G02B 6/4433 385/113 |
| 2008/0080818 | A1 * | 4/2008 | Cobb, III | | G02B 6/4475 385/86 |
| 2009/0034918 | A1 * | 2/2009 | Caldwell | | G02B 6/4494 385/107 |
| 2009/0274425 | A1 * | 11/2009 | Caldwell | | G02B 6/4433 385/102 |
| 2011/0002588 | A1 * | 1/2011 | Osato | | G02B 6/4429 385/113 |
| 2011/0052127 | A1 * | 3/2011 | Bollinger, Jr. | | G02B 6/4459 385/112 |
| 2011/0229097 | A1 * | 9/2011 | Roberts | | G02B 6/4416 385/101 |
| 2012/0301090 | A1 * | 11/2012 | Cline | | G02B 6/3889 385/103 |
| 2012/0315004 | A1 * | 12/2012 | Register, III | | G02B 6/4433 385/101 |

(56) References Cited

U.S. PATENT DOCUMENTS

| | | | | |
|---|---|---|---|---|
| 2012/0328253 A1* | 12/2012 | Hurley | ............... | G02B 6/4472 385/103 |
| 2013/0037301 A1* | 2/2013 | Paynter | ................. | H01P 3/06 174/115 |
| 2013/0037320 A1* | 2/2013 | Harwath | ................ | H01P 3/06 174/70 R |
| 2013/0038411 A1* | 2/2013 | Vaccaro | ................ | H01P 3/06 333/238 |
| 2013/0038412 A1* | 2/2013 | Moe | ...................... | H01P 3/06 333/238 |
| 2013/0094821 A1* | 4/2013 | Logan | ............... | G02B 6/4495 385/100 |
| 2013/0188916 A1* | 7/2013 | Bradley | ............ | G02B 6/4433 385/113 |

FOREIGN PATENT DOCUMENTS

| | | | | | |
|---|---|---|---|---|---|
| GB | 2219100 | A | * | 11/1989 | ............ G02B 6/443 |
| JP | 08271771 | A | * | 10/1996 | |
| JP | 10-197771 | A | | 7/1998 | |
| JP | 10197771 | A | * | 7/1998 | |
| JP | 2001-21780 | A | | 1/2001 | |
| JP | 2001021780 | A | * | 1/2001 | ............ G02B 6/4426 |
| JP | 2001-066479 | A | | 3/2001 | |
| JP | 2001066479 | A | * | 3/2001 | |
| JP | 2004-212771 | A | | 7/2004 | |
| JP | 2004212771 | A | * | 7/2004 | |
| JP | 2007-115636 | A | | 5/2007 | |
| JP | 2007115636 | A | * | 5/2007 | |
| JP | 2007127886 | A | * | 5/2007 | |
| JP | 2007-147759 | A | | 6/2007 | |
| JP | 2007147759 | A | * | 6/2007 | |
| JP | 2008076898 | A | * | 4/2008 | |
| JP | 2008-311124 | A | | 12/2008 | |
| JP | 2008311124 | A | * | 12/2008 | |
| JP | 2009216834 | A | * | 9/2009 | ............ G02B 6/4475 |
| JP | 2009237537 | A | * | 10/2009 | ............ G02B 6/4429 |
| TW | 200825489 | A | | 6/2008 | |
| WO | WO 9509376 | A1 | * | 4/1995 | ............ G02B 6/4403 |
| WO | 2008021253 | A2 | | 2/2008 | |
| WO | 2012/170391 | A1 | | 12/2012 | |
| WO | 2013/065625 | A1 | | 5/2013 | |

OTHER PUBLICATIONS

International Search Report of PCT/JP2014/076502 dated Nov. 25, 2014.
Communication dated Jul. 27, 2015 from the Taiwanese Patent Office in counterpart Taiwanese application No. 103133560.
International Preliminary Report on Patentability, dated Sep. 15, 2016, from the International Bureau in counterpart International application No. PCT/JP2014/076502.
Communication dated Dec. 7, 2016 from the Australian Patent Office in counterpart Application No. 2014385023.
Communication dated Apr. 5, 2017 issued by the Canadian Intellectual Property Office in counterpart Application No. 2936064.
Communication dated Aug. 21, 2017, from Korean Intellectual Property Office in counterpart application No. 10-2016-7011852.
Communication dated Sep. 5, 2017, from European Patent Office in counterpart application No. 14884393.1.
Communication dated Feb. 26, 2018 from the Korean Intellectual Property Office in counterpart Korean application No. 10-2016-7011852.

* cited by examiner

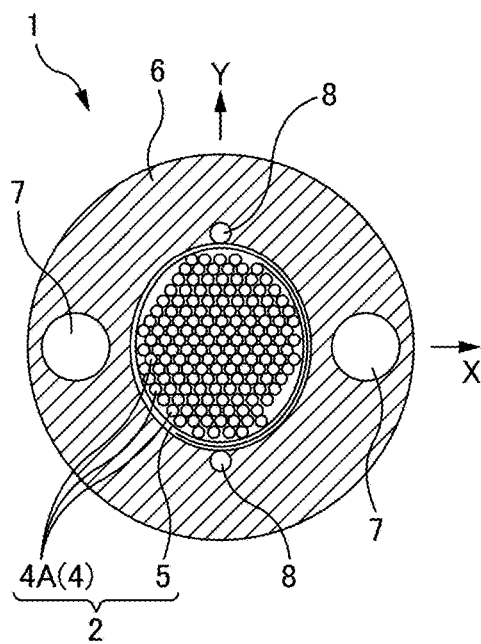
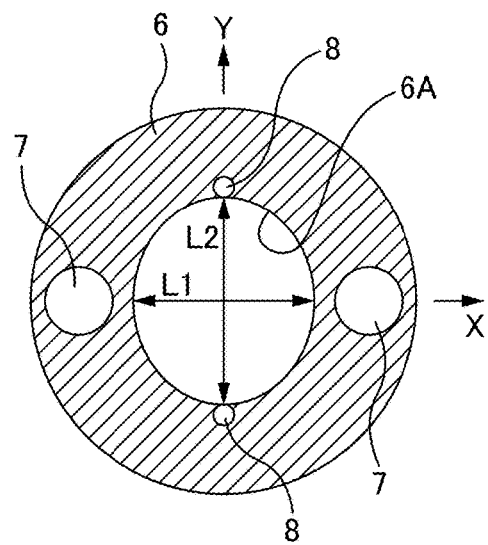
FIG. 1A            FIG. 1B
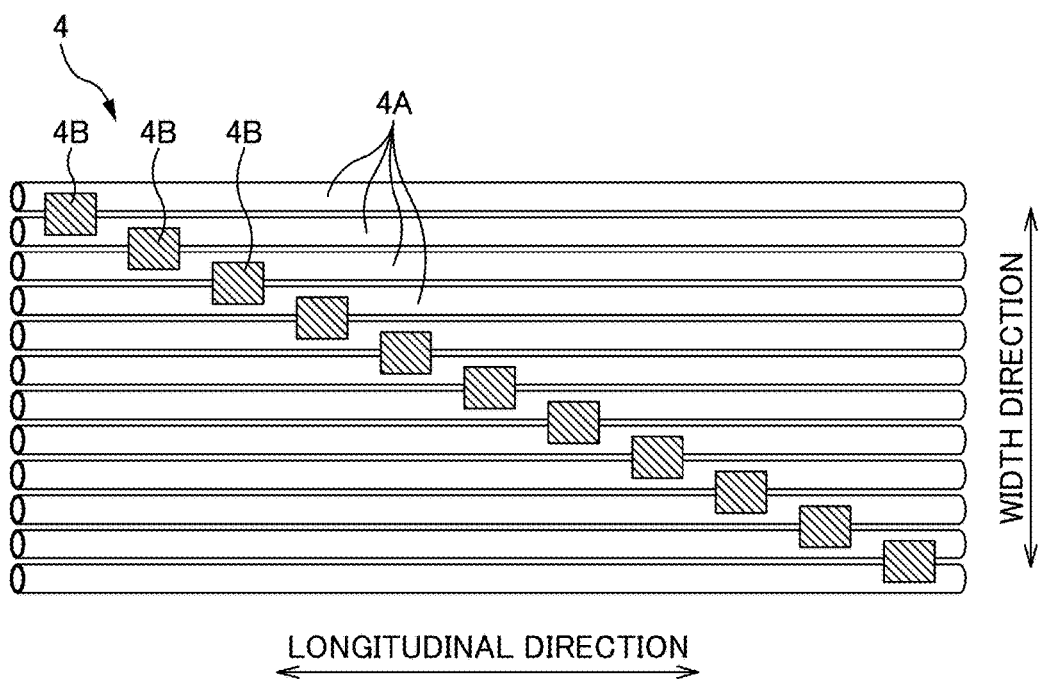
FIG. 2

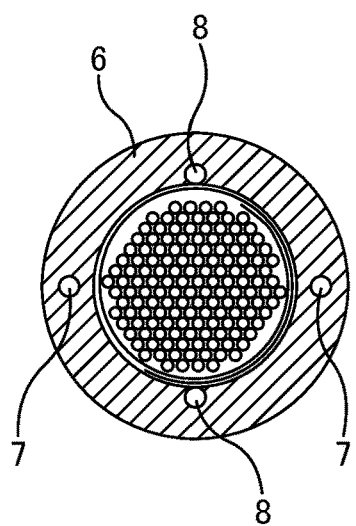
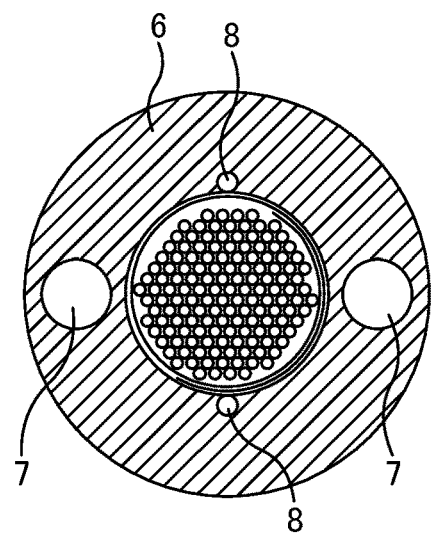
FIG. 3A
(REFERENCE EXAMPLE)
FIG. 3B
(REFERENCE EXAMPLE)
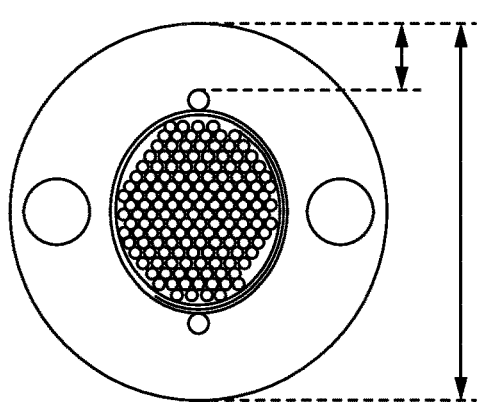
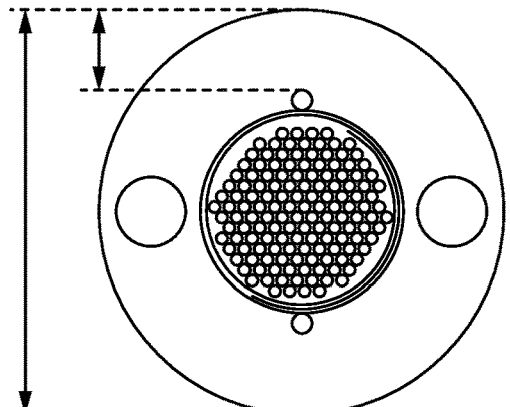
FIG. 4A
(FIRST EMBODIMENT)
FIG. 4B
(REFERENCE EXAMPLE)

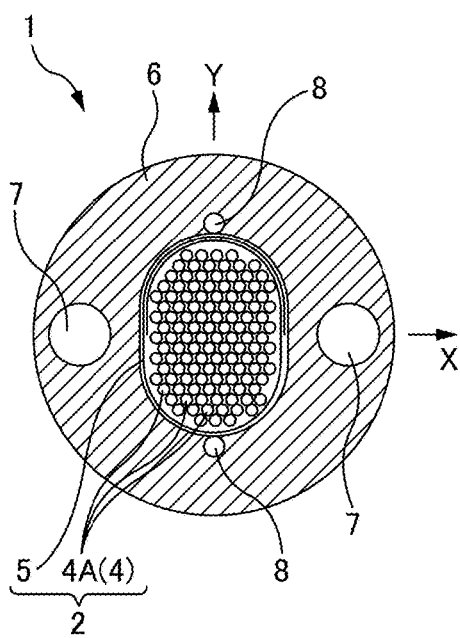
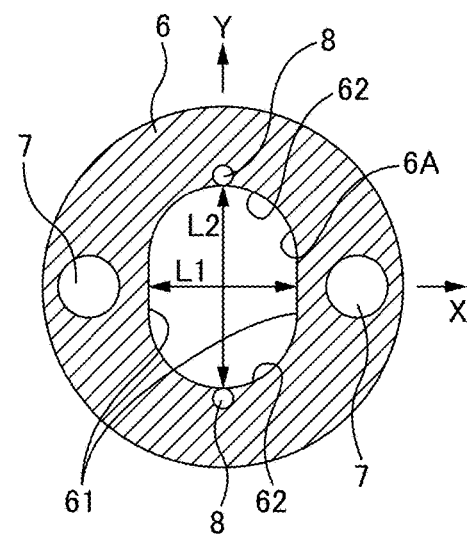
FIG. 5A        FIG. 5B
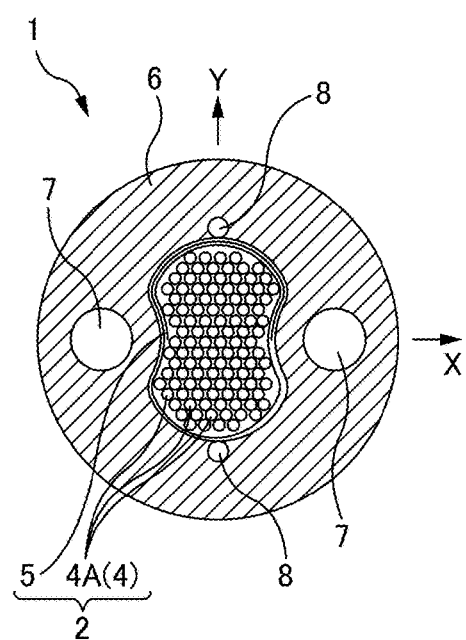
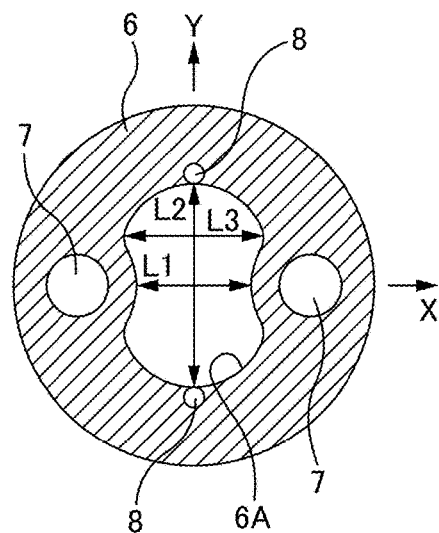
FIG. 6A        FIG. 6B

OPTICAL CABLE

CROSS REFERENCE TO RELATED APPLICATIONS

This application is a National Stage of International Application No. PCT/JP2014/076502 filed Oct. 3, 2014, claiming priority based on Japanese Patent Application No. 2014-043622, filed Mar. 6, 2014, the contents of which are incorporated herein by reference in their entirety.

TECHNICAL FIELD

The present invention relates to an optical cable.

BACKGROUND ART

There is known a slotless type optical cable in which a plurality of optical fibers is disposed within a sheath. Patent literature 1 and Patent literature 2 disclose an optical cable in which the cross-sectional surface of a housing portion for housing optical fibers is non-circular.

Strength members (tension members) are embedded in the sheath of the optical cable (see Patent Literature 1 and Patent Literature 2). Metallic wires such as steel wires are generally used for the strength members. Whereas, in the case where metallic wires are used for the strength members, a lightning surge may travel along the strength members, and thus a nonmetallic material such as glass FRP (GFRP) may be used for the strength members.

CITATION LIST

Patent Literature

[Patent Literature 1] Japanese Patent Application Laid-open Publication No. 2001-21780
[Patent Literature 2] Japanese Patent Application Laid-open Publication No. 2004-212771

SUMMARY OF INVENTION

Technical Problem

Since the strength members made of a nonmetallic material have a modulus of elasticity smaller than that of metallic wires, the strength members each result in having a relatively large outer diameter, to acquire strength required for an optical cable. When the sheath is increased in thickness so as to embed the thick strength members in the sheath, cladding on a rip cord is also increased in thickness accordingly. As a result, a great force is required for pulling the rip cord, and/or the rip cord that are pulled with a great force may break, which decreases workability.

There is a way to decrease cladding on the rip cord by forming the optical cable in a rectangular shape. However, since most of the existing closure, dead-end grips for gripping, etc., are intended for the circular optical cable 1, the optical cable may not be held with a sufficient holding force if formed in a rectangular shape. Thus, it is desirable that the optical cable has a circular external form.

A primary object of the present invention is to reduce the thickness of cladding on a rip cord in a circular optical cable, to improve workability.

Solution to Problem

A principal aspect of the present disclosure to achieve an object described above is an optical cable comprising: an optical fiber unit including a plurality of optical fibers; a sheath configured to house the optical fiber unit in a housing portion, the sheath having a circular external form; two strength members embedded in the sheath; and two rip cords, wherein when a direction of connecting the two strength members sandwiching the housing portion is a first direction and a direction intersecting the first direction is a second direction, in a cross section of the optical cable, a cross-sectional shape of the housing portion has a dimension in the second direction greater than a dimension in the first direction, and the two rip cords is disposed to sandwich the optical fiber unit such that a direction of connecting the two rip cords is in the second direction, in the cross section of the optical cable Other features of the present invention will become apparent from the description of this specification and the accompanying drawings.

Advantageous Effects of Invention

According to the present invention, it is possible to reduce the thickness of cladding on a rip cord in a circular optical cable, to improve workability.

BRIEF DESCRIPTION OF DRAWINGS

FIG. 1A is a cross-sectional view of an optical cable 1 according to a first embodiment. FIG. 1B is an explanatory diagram of a cross-sectional shape of a housing portion 6A in a sheath 6 according to a first embodiment but with an optical fiber unit 2 in FIG. 1A omitted.

FIG. 2 is an explanatory diagram of an optical fiber tape 4 of an intermittently fixed type.

FIGS. 3A and 3B are comparative diagrams explaining reference examples using strength members 7 having different diameters.

FIGS. 4A and 4B are comparative explanatory diagrams for comparing optical cables between a present embodiment and a reference example. FIG. 4A is an explanatory diagram of an optical cable 1 according to a present embodiment. FIG. 4B is an explanatory diagram of an optical cable 1 in a reference example illustrated in FIG. 3B.

FIG. 5A is a cross-sectional view of an optical cable 1 according to a second embodiment. FIG. 5B is an explanatory diagram of a cross-sectional shape of a housing portion 6A in a sheath 6 according to a second embodiment but with an optical fiber unit 2 in FIG. 5A omitted.

FIG. 6A is a cross-sectional view of an optical cable 1 according to a third embodiment. FIG. 6B is an explanatory diagram of a cross-sectional shape of a housing portion 6A according to a third embodiment but with an optical fiber unit 2 in FIG. 6A omitted.

DESCRIPTION OF EMBODIMENTS

Figure 7:
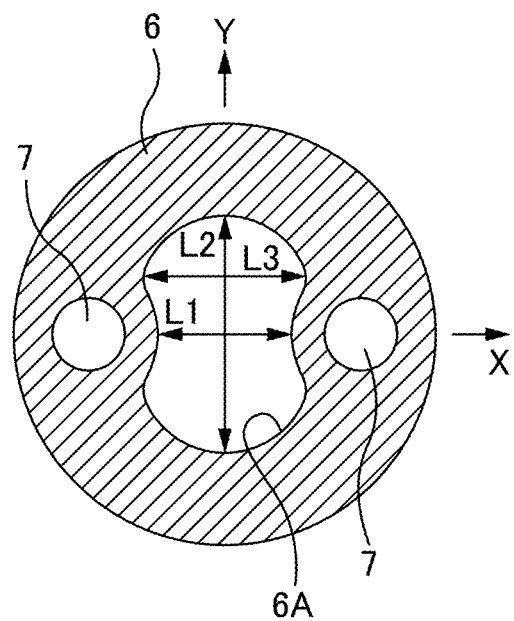
FIG. 7 is a reference explanatory diagram without a rip cord.

At least the following matters will become apparent from the description in the present specification and the accompanying drawings.

An optical cable will become apparent that comprises: an optical fiber unit including a plurality of optical fibers; a sheath configured to house the optical fiber unit in a housing portion, the sheath having a circular external form; two strength members embedded in the sheath; and two rip cords, wherein when a direction of connecting the two strength members sandwiching the housing portion is a first direction and a direction intersecting the first direction is a second direction, in a cross section of the optical cable, a cross-sectional shape of the housing portion has a dimension in the second direction greater than a dimension in the first direction, and the two rip cords is disposed to sandwich the optical fiber unit such that a direction of connecting the two rip cords is in the second direction, in the cross section of the optical cable.

According to such an optical cable, it is possible to reduce the thickness on a rip cord in a circular optical cable, to improve workability.

It is desirable that the cross-sectional shape of the housing portion is an elliptical shape whose minor axis is in the first direction and major axis is in the second direction. Accordingly, it is possible to reduce the thickness on a rip cord in a circular optical cable, thereby improving workability.

It is desirable that the plurality of optical fibers are twisted in an SZ manner, and L1/L2 is equal to or greater than 0.55, where L1 is a dimension of the housing portion in the first direction and L2 is a dimension thereof in the second direction. Accordingly, transmission loss can be restrained.

It is desirable that the cross-sectional shape of the housing portion is in such a shape as to be enclosed by two straight portions along the second direction and two arc-shaped portions on both sides in the second direction of the straight portions. Accordingly, it is possible to reduce the thickness on a rip cord in a circular optical cable, thereby improving workability.

It is desirable that the plurality of optical fibers are twisted in an SZ manner, and L1/L2 is equal to or greater than 0.60, where L1 is a dimension of the housing portion in the first direction and L2 is a dimension thereof in the second direction. Accordingly, transmission loss can be restrained.

It is desirable that the cross-sectional shape of the housing portion is in such a shape as to be narrowed at a line connecting the two strength members. Accordingly, it is possible to reduce the thickness on a rip cord in a circular optical cable, to improve workability.

It is desirable that the plurality of optical fibers are twisted in an SZ manner, and L1/L2 is equal to or greater than 0.75, where L1 is a dimension of the housing portion in the first direction and L2 is a dimension thereof in the second direction. Accordingly, transmission loss can be restrained.

It is desirable that the plurality of optical fibers are twisted in a single direction. Accordingly, transmission loss can be restrained.

It is desirable that the strength members are made of a nonmetallic material. It is especially advantageous in such a case.

===Optical Cable 1 of First Embodiment===
<Configuration of Optical Cable 1>

FIG. 1A is a cross-sectional view of an optical cable 1 according to a first embodiment. FIG. 1B is an explanatory diagram of a cross-sectional shape of a housing portion 6A in a sheath 6 according to a first embodiment but with an optical fiber unit 2 in FIG. 1A omitted. The optical cable 1 includes the plurality of optical fibers 4A, a press-wrapping tape 5, the sheath 6, a pair of strength members 7, and a pair of rip cords 8. In the following description, an assembly of the plurality of optical fibers 4A and the press-wrapping tape 5 may be referred to as the "optical fiber unit 2". However, in the case of the optical cable 1 without the press-wrapping tape 5, a bundle of the plurality of optical fibers 4A may be referred to as the "optical fiber unit 2". Further, the "optical fiber unit" may be referred to as an "optical fiber core".

The plurality of optical fibers 4A are formed here by bundling twelve sheets of the intermittently fixed type optical fiber tape 4. One sheet of the intermittently fixed type optical fiber tape 4 is configured with twelve optical fibers, and the optical cable 1 includes 144 optical fibers 4A in total.

FIG. 2 is an explanatory diagram of the intermittently fixed type optical fiber tape 4. The intermittently fixed type optical fiber tape 4 indicates such an optical fiber tape 4 that the connecting portions 4B, each connecting between the optical fibers 4A immediately adjacent to each other, are disposed intermittently in the longitudinal direction and the width direction of the optical fibers 4A.

The intermittently fixed type optical fiber tape 4 is configured with three or more optical fibers 4A (optical fiber core wires) parallel to one another. The plurality of connecting portions 4B each connecting between the two optical fibers 4A adjacent to each other are disposed intermittently in the longitudinal direction and the width direction in a two dimensional manner. The connecting portions 4B are portions each connecting between the two optical fibers 4A adjacent to each other using, for example, an ultraviolet curable resin or a thermoplastic resin. An area other than the connecting portions 4B each connecting between the two optical fibers 4A adjacent to each other is a non-connecting portion. Each of two the optical fibers 4A are not restricted in the non-connecting portion. As a result, the optical fiber tape 4 can be rolled in a cylindrical manner (in a bundle), folded to be stored, or the like, and thus a large number of the optical fibers 4A can densely be housed in the optical cable 1.

Note that the plurality of optical fibers 4A may not be configured with the intermittently fixed type optical fiber tape 4. For example, the optical fibers 4A may be configured with a single optical fiber 4A in place of the intermittently fixed type optical fiber tape 4. Further, the number of the optical fibers 4A is not limited to 144. Further, a bundle of the plurality of optical fibers 4A may be configured such that a plurality of optical fiber bundles each bundled using a bundling material (identification member) are bundled. In this case, an optical fiber bundle bundled with a bundling material also may be referred to as a "sub-unit".

The press-wrapping tape 5 is a member configured to wrap the plurality of optical fibers 4A. Polyimide tape, polyester tape, polypropylene tape, polyethylene tape, and/or the like is used for the press-wrapping tape 5. In addition thereto, nonwoven fabric can be utilized as the press-wrapping tape 5. In this case, one formed from polyimide, polyester, polypropylene, polyethylene, and/or the like into tape is used for such nonwoven fabric. It should be noted that the nonwoven fabric may be one attached/applied with absorbent powder, etc., or one subjected to surface processing therefor. The press-wrapping tape 5 may also be one formed by attaching a film such as a polyester film to the nonwoven fabric.

The sheath 6 is a member configured to cover the optical fiber unit 2 (the plurality of optical fibers 4A and the press-wrapping tape 5) in such a manner as to be housed in the housing portion 6A. As a material of the sheath 6, for example, a resin of polyvinyl chloride (PVC), polyethylene (PE), nylon (registered trademark), fluorinated ethylene or polypropylene (PP), and/or the like can be used. Further, a polyolefin compound, which contains a hydrated metal compound, such as magnesium hydroxide and aluminum hydroxide as flame retardant, can be used as a material of the sheath 6. Here, medium density polyethylene is used for the sheath 6. A pair of strength members 7 and a pair of rip cords are embedded in the sheath 6.

In a present embodiment, the external form of the sheath 6 is circular. Since most of existing closures, dead-end grips for gripping, etc., are intended for the circular optical cable 1, they can be applied to the optical cable 1 according to a present embodiment.

The strength members 7 are members configured to resist shrinkage of the sheath 6 to restrain distortion or bending applied to the optical fiber unit 2 due to the shrinkage of the sheath 6. The strength members 7 are linear members, and are embedded within the sheath 6 such that the longitudinal direction thereof is along the longitudinal direction (cable direction) of the optical cable 1. A nonmetallic material or a metallic material can be used as a material of the strength members 7. As a nonmetallic material, Fiber Reinforced Plastic (FRP) such as glass FRP (GFRP), Aramid Fiber Reinforced Plastic reinforced with Kevlar (registered trademark) (KFRP), polyethylene fiber reinforced plastic reinforced with polyethylene fiber, or the like can be used. As a metallic material, metallic wire such as steel wire can be used. Here, glass FRP is used for the strength members 7.

The rip cords 8 are cords (rip cords) used for ripping the sheath 6. A worker pulls the rip cords and rips the sheath 6, to strip the sheath 6, thereby taking out the optical fibers 4A in the optical cable 1. The rip cords 8 are longitudinally attached to the periphery of the optical fiber unit 2, and are embedded in the sheath 6, or disposed between the sheath 6 and the optical fiber unit 2. Fiber such as polyester, polyimide, aramid, or the like, fiber assembly, or one formed by impregnating fiber with resin can be used for the rip cords 8.

<Arrangement of Strength Members 7 and Rip Cords 8>

A pair of the strength members 7 is embedded within the sheath 6 in such a manner as to sandwich the optical fiber unit 2 (or the housing portion 6A). In the following description, a direction of connecting a pair of the strength members 7 in a cross-section of the optical cable 1 may be referred to as an X-direction (first direction), a direction orthogonal to the X-direction may be referred to as a Y-direction (second direction). It should be noted that a face connecting a pair of the strength members 7 results in a neutral surface when the optical cable 1 is bent, and a line connecting a pair of the strength members 7 results in a line on the neutral surface. In the case where each two or more of the strength members 7 are disposed each on the left and right sides (for example, see FIG. 15 which will be described later), and the optical fiber unit 2 (or the housing portion 6A) is sandwiched between the two or more of the strength members 7 on one side and the two or more of the strength members 7 on the other side, the X-direction results in a direction of connecting the intermediate position of the two or more of the strength members 7 on one side and the intermediate position of the two or more of the strength members 7 on the other side. Further, such a line as to connect the intermediate positions also results in a line on the neutral surface when the optical cable 1 is bent.

A pair of the rip cords 8 is embedded in the sheath 6 in such a manner as to sandwich the plurality of optical fibers 4A (or the housing portion 6A). A direction of connecting a pair of the rip cords 8 in a cross-section of the optical cable 1 is in the Y-direction (second direction).

FIGS. 3A and 3B are comparative explanatory diagrams illustrating optical cables in reference examples using the strength members 7 having different diameters. FIG. 3A is an explanatory diagram illustrating the optical cable in the reference example using the strength members 7 made of steel wire. FIG. 3B is an explanatory diagram illustrating the optical cable in the reference example using the strength members 7 made of glass FRP. As illustrated in FIG. 3B, in the case where glass FRP, which is a nonmetallic material, is used for the strength members 7, it is necessary to increase the outer diameter of the strength members 7 configured with glass FRP, in order to acquire strength required for an optical cable, since the glass FRP has a modulus of elasticity smaller than that of steel wire.

In addition thereto, it is necessary to secure a predetermined cladding thickness (for example, 0.6 mm) around the strength members 7, in order for the strength members 7 to perform their functions. Thus, in the case where the strength members 7 are increased in diameter, the sheath 6 is required to be increased in thickness.

However, if the sheath 6 is increased in thickness accordingly in order to embed the thick strength members 7 in the sheath 6, cladding with respect to the rip cords 8 (rip cords) is also increased in thickness accordingly. If the cladding on the rip cords 8 is increased in thickness, a great force is required for pulling the rip cords 8, or the rip cords 8 that are pulled with a great force may break, resulting in decrease in workability.

FIGS. 4A and 4B are comparative explanatory diagrams for comparing optical cables between a present embodiment and a reference example. FIG. 4A is an explanatory diagram of the optical cable 1 according to a present embodiment. FIG. 4B is an explanatory diagram of the optical cable 1 in the reference example illustrated in FIG. 3B.

As illustrated in FIG. 4A, in a present embodiment, the housing portion 6A of the sheath 6 for housing the optical fiber unit 2 is elliptical. In a cross section of the optical cable 1, the minor axis of the housing portion 6A in an elliptical shape is in the X-direction (is on a neutral surface when the optical cable 1 is bent), and the major axis thereof is in the Y-direction. In other words, a cross-sectional shape of the housing portion 6A has a dimension in the Y-direction (major axis) greater than a dimension in the X-direction (minor axis), and is in a shape extending in the Y-direction.

In a present embodiment, the sheath 6 has a circular external form, and the housing portion 6A of the sheath 6 is in an elliptical shape. Thus, in the minor axis direction (X-direction) of the housing portion 6A in the elliptical shape, a dimension from the inner peripheral surface of the housing portion 6A to the outer peripheral surface of the sheath 6 is increased, while in the major axis direction (Y-direction) of the housing portion 6A in the elliptical shape, a dimension from the inner peripheral surface of the housing portion 6A to the outer peripheral surface of the sheath 6 is decreased. That is, the sheath 6 is thicker in the X-direction and thinner in the Y-direction (see also FIG. 1B).

Further, in a present embodiment, the strength members 7 are disposed in the X-direction when viewed from the housing portion 6A. That is, the strength members 7 are disposed in the direction in which the sheath 6 is thicker. Thus, in a present embodiment, the thickness of the sheath 6 sufficient to embed the strength members 7 can be secured, even if the outer diameter of the sheath 6 is not increased as in the reference example. As a result, the optical cable 1 according to a present embodiment can be made thinner while the area of the housing portion 6A being maintained constant, as compared with the reference example illustrated in FIG. 4B.

On the other hand, in a present embodiment, the rip cords 8 are disposed in the Y-direction when viewed from the housing portion 6A. That is, the rip cords 8 are disposed in the direction in which the sheath 6 is thinner. As a result, in a present embodiment, the cladding thickness on the rip cords 8 (dimension(s) from the rip cord(s) 8 to the outer peripheral surface of the sheath 6) can be reduced, as compared with that in the reference example illustrated in FIG. 4B. That is, in the optical cable 1 according to a present embodiment, it is possible to reduce the cladding thickness on the rip cords 8 while keeping such a space that optical fibers can endure expansion and contraction of the cable caused by temperature change, etc., (i.e., while keeping the area of the housing portion 6A), thereby being able to reduce the outer diameter of the optical cable 1. Further, as in a present embodiment, reduction in the cladding thickness on the rip cords 8 can reduce the force for pulling the rip cords 8, which improves workability. Further, break in the rip cords 8 can be restrained.

It should be noted that the cladding thickness on the rip cords 8 can be reduced even by only making the optical cable 1 thinner, however, in a present embodiment, with the rip cords 8 being disposed in the Y-direction, the cladding thickness on the rip cords 8 can further be reduced. That is, in a present embodiment, such an effect as to reduce the cladding thickness on the rip cords 8 can synergistically be obtained.

===Optical Cable 1 of Second Embodiment===

FIG. 5A is a cross-sectional view illustrating an optical cable 1 according to a second embodiment. FIG. 5B is an explanatory diagram of a cross-sectional shape of a housing portion 6A in a sheath 6 according to a second embodiment but with an optical fiber unit 2 in FIG. 5A omitted. As compared with a first embodiment, the housing portion 6A according to a second embodiment has a different shape.

A cross-sectional shape of the housing portion 6A according to a second embodiment has a dimension in the Y-direction greater than a dimension in the X-direction and is in a shape extending in the Y-direction, similarly to that in a first embodiment. Since the sheath 6 has a circular external form, the sheath 6 is thicker in the X-direction and thinner in the Y-direction, also in a second embodiment.

Further, a pair of the strength members 7 are embedded within the sheath 6 in such a manner as to sandwich the optical fiber unit 2 (or the housing portion 6A) from the X-direction, also in a second embodiment. That is, the strength members 7 are disposed in the direction in which the sheath 6 is thicker, also in a second embodiment. Thus, the optical cable 1 can be made thinner while keeping the area of the housing portion 6A constant, as compared with that in the reference example illustrated in FIG. 4B, also in a second embodiment.

Further, a pair of the rip cords 8 are embedded in the sheath 6 in such a manner as to sandwich the optical fiber unit 2 (or the housing portion 6A) from the Y-direction. That is, the rip cords 8 are disposed in the direction in which the sheath 6 is thinner, also in a second embodiment. Thus, the cladding thickness on the rip cords 8 (dimension(s) from the rip cord(s) 8 to the outer peripheral surface of the sheath 6) can be made thinner, as compared with that in the reference example illustrated in FIG. 4B, also in a second embodiment. That is, it is possible to reduce the cladding thickness on the rip cords 8 while keeping such a space that optical fibers can endure expansion and contraction of the cable caused by temperature change, etc., (i.e., while keeping the area of the housing portion 6A), thereby being able to reduce the outer diameter of the optical cable 1, also in a second embodiment.

The housing portion 6A according to the aforementioned first embodiment is in an elliptical shape, whereas, the housing portion 6A according to a second embodiment has a cross-sectional shape enclosed by two straight portions 61 along the Y-direction and two curved portions 62 disposed on both sides in the Y-direction of these straight portions 61. Since this shape is similar to the shape of a track in a track race, the shape may be referred to as a "track shape" in the following description.

The two straight portions 61 in a cross section of the optical cable 1 are disposed in a manner perpendicular to a line connecting the two strength members 7, at the line connecting the two strength members 7. Two planes opposed to each other serving as inner peripheral surfaces of the housing portion 6A in the optical cable 1 (planes extending in the cable direction of the optical cable 1) configure the two straight portions 61 in a cross section of the optical cable 1.

The two curved portions 62 in a cross section of the optical cable 1 are semicircles having a predetermined radius. However, they are not limited to semicircles, as long as a predetermined radius of curvature is secured. For example, the two curved portions 62 each may be a part of a semicircle or a part of an ellipse. With the two curved portions 62, the housing portion 6A results in a shape bulging outwardly at a line connecting the two rip cords 8. Thus, the cladding thickness on the rip cords 8 can be made thinner, as compared with that in the case where the housing portion 6A is formed in a rectangular shape obtained by forming the curved portions 62 into the straight portions 61.

In the case where the housing portion 6A is in an elliptical shape as in a first embodiment, the housing portion 6A results in a shape bulging toward the strength members 7 on a line connecting the two strength members. Thus, when the cross-sectional areas of the housing portion 6A are the same, it is necessary to increase a dimension in the X-direction of the housing portion 6A in a first embodiment, as compared with that in a second embodiment. As a result, a dimension in the Y-direction of the housing portion 6A is reduced. In other words, when the straight portions 61 are arranged at a line connecting the two strength members 7 as in a second embodiment, a dimension in the X-direction of the housing portion 6A can be made smaller and a dimension in the Y-direction of the housing portion 6A can be made greater than those in a first embodiment. Thus, in a second embodiment, the optical cable 1 can be made thinner than that in a first embodiment and also the cladding thickness on the rip cords 8 (dimension(s) from the rip cord(s) 8 to the outer peripheral surface of the sheath 6) can be made further smaller.

===Optical Cable 1 of Third Embodiment===

FIG. 6A is a cross-sectional view of an optical cable 1 according to a third embodiment. FIG. 6B is an explanatory diagram of a cross-sectional shape of a housing portion 6A in a sheath 6 according to a third embodiment but with an optical fiber unit 2 in FIG. 6A omitted. When comparing a third embodiment with first and second embodiments, the housing portion 6A according to a third embodiment has a different shape.

A cross-sectional shape of the housing portion 6A according to a third embodiment has a dimension in the Y-direction greater than a dimension in the X-direction, and is in a shape extending in the Y-direction, similarly to those in first and second embodiments. Since the sheath 6 has a circular external form, the sheath 6 is thicker in the X-direction and thinner in the Y-direction, also in a third embodiment.

Further, a pair of the strength members 7 is embedded within the sheath 6 in such a manner as to sandwich the optical fiber unit 2 (or the housing portion 6A) from the X-direction, also in a third embodiment. That is, the strength members 7 are disposed in the direction in which the sheath 6 is thicker, also in a third embodiment. Thus, the optical cable 1 can be made thinner, while keeping the area of the housing portion 6A constant, as compared with that in the reference example illustrated in FIG. 4B, also in a third embodiment.

Further, a pair of the rip cords 8 is embedded in the sheath 6 in such a manner as to sandwich the optical fiber unit 2 (or the housing portion 6A) from the Y-direction. That is, the rip cords 8 are disposed in the direction in which the sheath 6 is thinner, also in a third embodiment. Thus, the cladding thickness on the rip cords 8 (dimension(s) from the rip cord(s) 8 to the outer peripheral surface of the sheath 6) can be made thinner than that in the reference example in the FIG. 4B, also in a third embodiment. That is, it is possible to reduce the cladding thickness on the rip cords 8 while keeping such a space that optical fibers can endure expansion and contraction of the cable caused by temperature change, etc., (i.e., while keeping the area of the housing portion 6A), thereby being able to reduce the outer diameter of the optical cable 1, also in a third embodiment.

The housing portion 6A according to a third embodiment has such a cross-sectional shape as to be narrowed on a line connecting the two strength members 7. In the following description, this shape may be referred to as a "narrowed shape".

In the narrowed shape, a dimension L3 in the X-direction of the housing portion 6A at a position distant from a line connecting the two strength members 7 is greater than a dimension L1 in the X-direction of the housing portion 6A on the line connecting the two strength members 7. In other words, in the case of the narrowed shape, the maximum dimension L3 in the X-direction of the housing portion 6A is at a position different from a position on the line connecting the two strength members 7. As a result, the cross-sectional area of the housing portion 6A can be secured while the dimension L1 in the X-direction of the housing portion 6A on the line connecting the two strength members 7 is narrowed.

It should be noted that the maximum dimension L3 in the X-direction of the housing portion 6A is preferably positioned to be distant from the line connecting the strength members 7 by a distance of a radius of the strength members 7 or more. Thereby, the maximum dimension L3 in the X-direction of the housing portion 6A can easily be increased, since the strength members 7 are not located in positions in the X-direction of the maximum dimension L3 in the X-direction of the housing portion 6A.

In a third embodiment, the housing portion 6A is narrowed inwardly at the line connecting the two strength members 7. Thus, if the cross-sectional areas of the housing portion 6A are the same, a dimension in the X-direction of the housing portion 6A on the line connecting the two strength members 7 can be made smaller and a dimension in the Y-direction of the housing portion 6A can be made greater, in a third embodiment, than those in other embodiments. Thus, in a third embodiment, the optical cable 1 can be made thinner than those in other embodiments, and also the cladding thickness on the rip cords 8 (dimension(s) from the rip cord(s) 8 to the outer peripheral surface of the sheath 6) can be further reduced.

It should be noted that, as has been described above, in the case where the housing portion 6A has a narrowed shape in cross-section, such an effect can be obtained that the dimension L1 in the X-direction of the housing portion 6A at the line connecting the two strength members 7 can be reduced, thereby being able to make the optical cable 1 thinner. However, this effect itself can be obtained also in the case of the optical cable 1 without the rip cords 8 (however, in a present embodiment, an object is to reduce the cladding thickness on the rip cords 8 on the premise that the optical cable 1 includes the rip cords 8).

FIG. 7 is a reference explanatory diagram of an embodiment without any rip cord. As illustrated in the drawing, the dimension L3 in the X-direction of the housing portion 6A at a position distant from the line connecting the two strength members 7 is greater than the dimension L1 in the X-direction of the housing portion 6A on a line connecting the two strength members 7. That is, the housing portion 6A is in such a shape as to be narrowed inwardly at the line connecting the two strength members 7. Thus, if the cross-sectional areas of the housing portion 6A are the same, the dimension L1 in the X-direction of the housing portion 6A on the line connecting the two strength members 7 can be made smaller than the dimensions in other embodiments, even if the rip cords 8 are not provided as in FIG. 7. Thus such an effect that the optical cable 1 can be made thinner can be obtained.

===Method of Manufacturing Optical Cable 1===

Figure 8A:
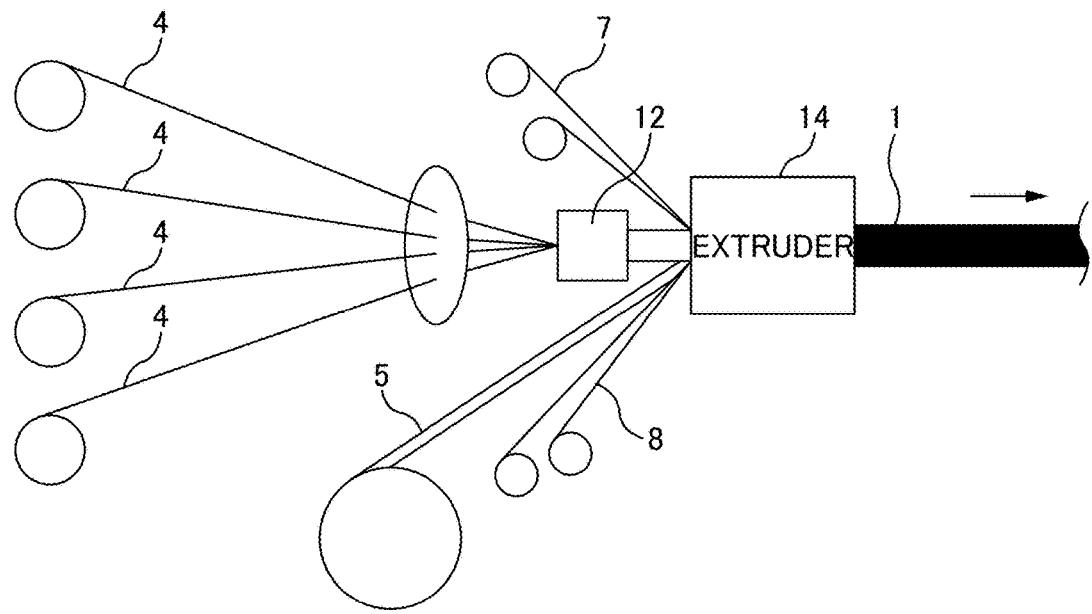
FIG. 8A is a process diagram for a manufacturing apparatus of an optical cable 1.

FIG. 8A is a process diagram illustrating a manufacturing apparatus of the optical cable 1.

A plurality of pieces (here, twelve pieces) of the intermittently fixed type optical fiber tape 4 is supplied to a collector 12. The plurality of optical fibers 4A assembled by being twisted in an SZ manner using the collector 12 are wrapped with the press-wrapping tape 5, to be supplied to an extruder 14. The optical fiber unit 2 (here, the plurality of optical fibers 4A and the press-wrapping tape 5), the two strength members 7, and the two rip cords 8 are supplied to the extruder 14. The extruder 14 is configured to coat the optical fiber unit 2 with the sheath 6 therearound while running the optical fiber unit 2 and letting out the strength members 7 and the rip cords 8 from their supply sources, respectively.

Figure 8B:
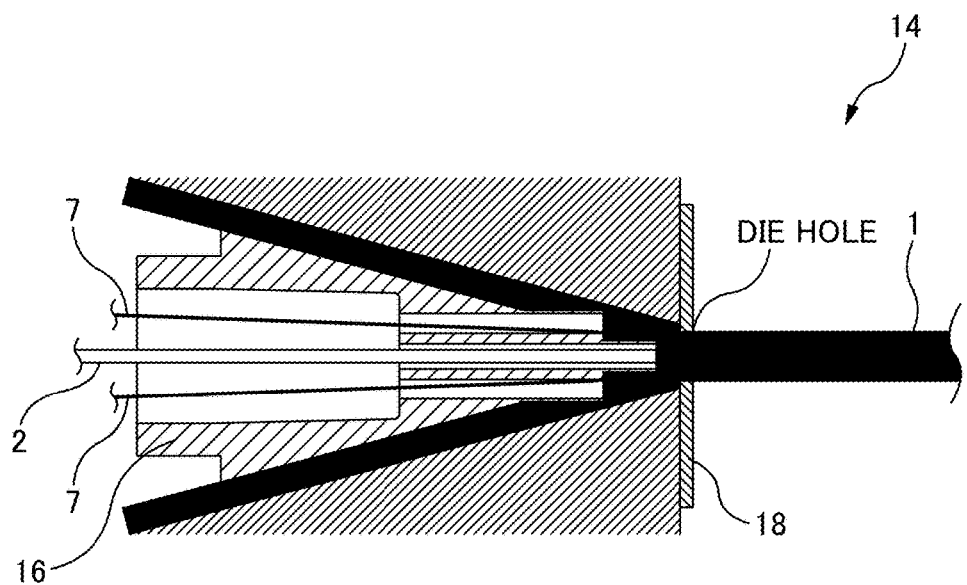
FIG. 8B is an explanatory diagram of a nipple 16 and a die 18 of an extruder 14.

FIG. 8B is an explanatory diagram illustrating a nipple 16 and a die 18 of the extruder 14.

The optical fiber unit 2 (the plurality of optical fibers 4A and the press-wrapping tape 5), the strength members 7, and the rip cords 8, supplied to the extruder 14, are guided by the nipple 16 to a die hole. A resin for configuring the sheath 6 is filled in the die 18, and the circular optical cable 1 covered with the sheath 6 is extruded from the circular die hole.

Figure 9A:
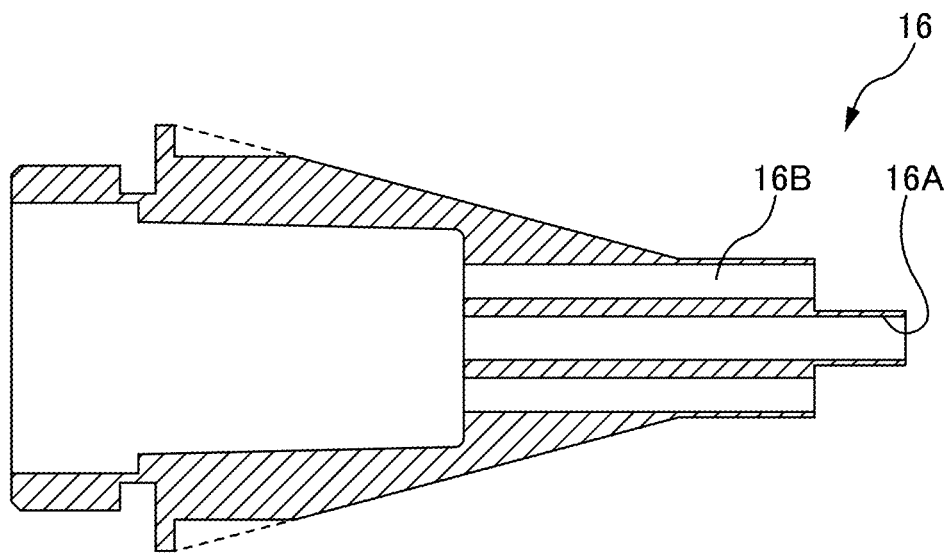
FIGS. 9A and 9B are explanatory diagrams of a nipple 16.
Figure 9B:
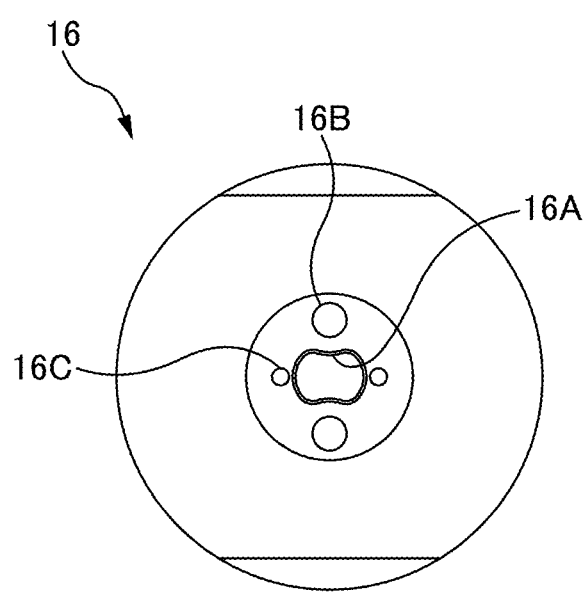

FIGS. 9A and 9B are explanatory diagrams illustrating the nipple 16.

A guide hole 16A for guiding the optical fiber unit 2 is formed in the nipple 16. Further, holes 16B for guiding the strength members 7 and holes 16C for guiding the rip cords 8 are formed in the nipple 16. A cross-sectional shape of the guide hole 16A for guiding the optical fiber unit 2 is an elliptical shape when the optical cable 1 according to a first embodiment is manufactured, a track shape when the optical cable 1 according to a second embodiment is manufactured, and a narrowed shape when the optical cable 1 according to a third embodiment is manufactured. The cross-sectional shape of the guide hole 16A in the drawing is a narrowed shape. The guide hole 16A has a dimension in the Y-direction greater than a dimension in the X-direction, and has a shape extending in the Y-direction. Thus, the optical fiber unit 2 running in a Z-direction is squeezed in the X-direction when being guided to the guide hole 16A.

The present inventors discover that, in the case where the plurality of optical fibers 4A are twisted in an SZ manner, a phenomenon of "untwisting", which will be described next, occurs when the optical fiber unit 2 is passed through the guide hole 16A of a shape extending in the Y-direction and when the plurality of optical fibers 4A in the optical fiber unit 2 are squeezed with the guide hole 16A.

Figure 10A:
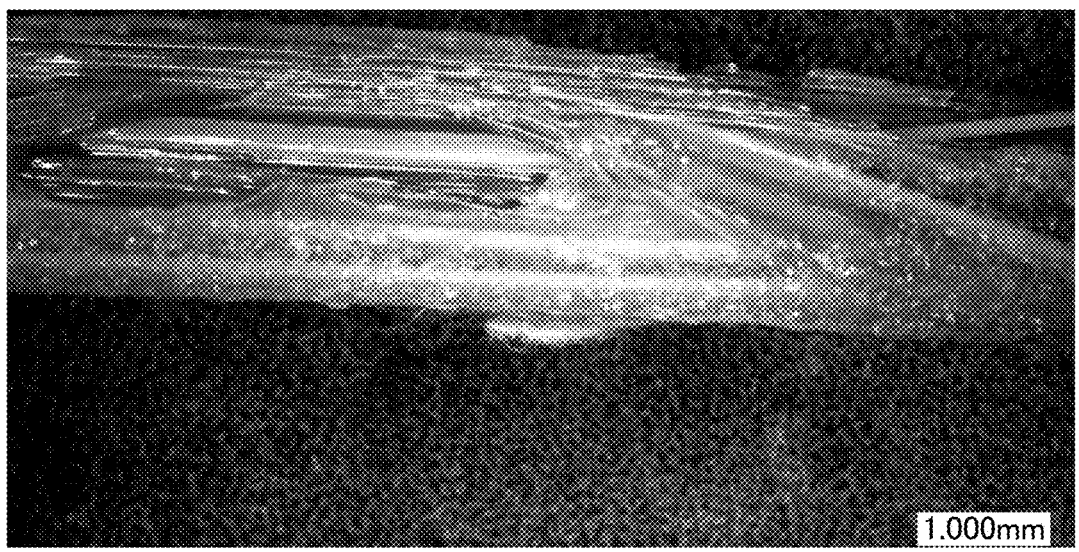
FIG. 10A is a photograph of an optical cable 1 in which a phenomenon of "untwisting" has occurred.
Figure 10B:
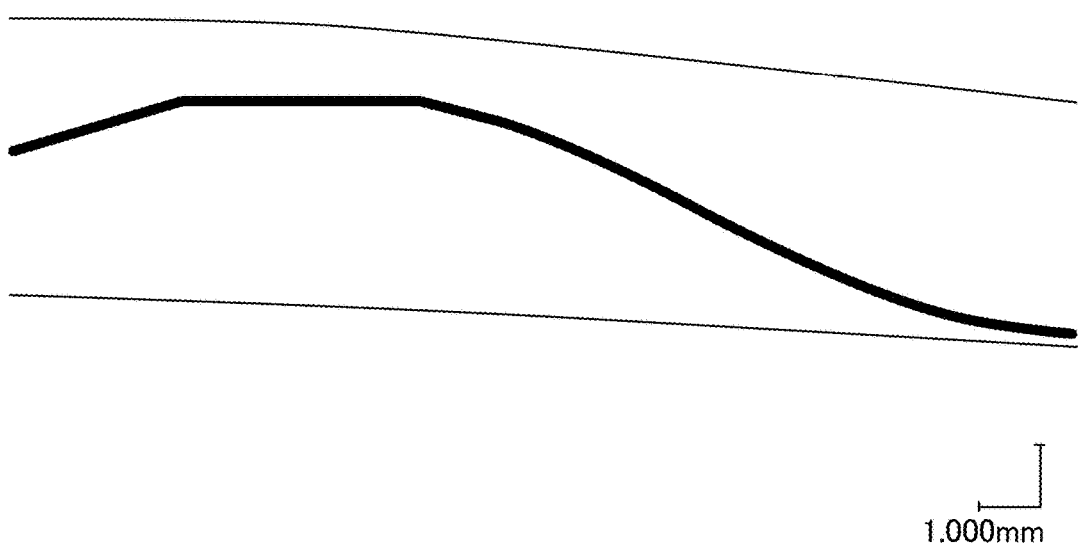
FIG. 10B is an explanatory diagram of a state of a certain optical fiber 4A in FIG. 10A.

FIG. 10A is a photograph of the optical cable 1 when the phenomenon of "untwisting" has occurred. This photograph was taken such that the inside of the optical cable 1 is exposed with the sheath 6, etc., removed after the inside thereof is subjected to bonding. FIG. 10B is an explanatory diagram illustrating a state of a certain optical fiber 4A in FIG. 10A. When the phenomenon of "untwisting" occurs, an area without any twist and an area in which an optical fiber abruptly meanders are partially created in the optical fibers 4A in the optical cable 1. If there is such an area without any twist in the optical fibers 4A, excessive compressive strain and/or elongation strain is added when the optical cable 1 is wound about a drum. As a result, transmission characteristics may deteriorate and/or break life may be reduced. Further, if there is an area in which an optical fiber abruptly meanders (an area in which an abrupt bend is applied to the optical fibers 4A), transmission characteristics may deteriorate, and/or the optical fibers 4A may break. Since the optical fiber 4A illustrated in FIG. 10B has an area of abrupt meandering, the transmission characteristics are considered to deteriorate in this area.

Figure 11A:
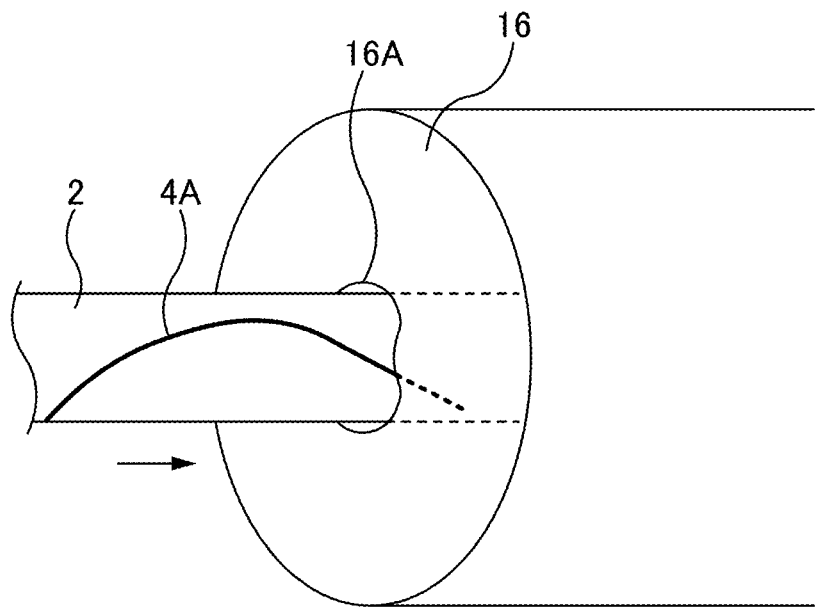
FIGS. 11A and 11B are explanatory diagrams of an "untwisting" occurring mechanism.
Figure 11B:
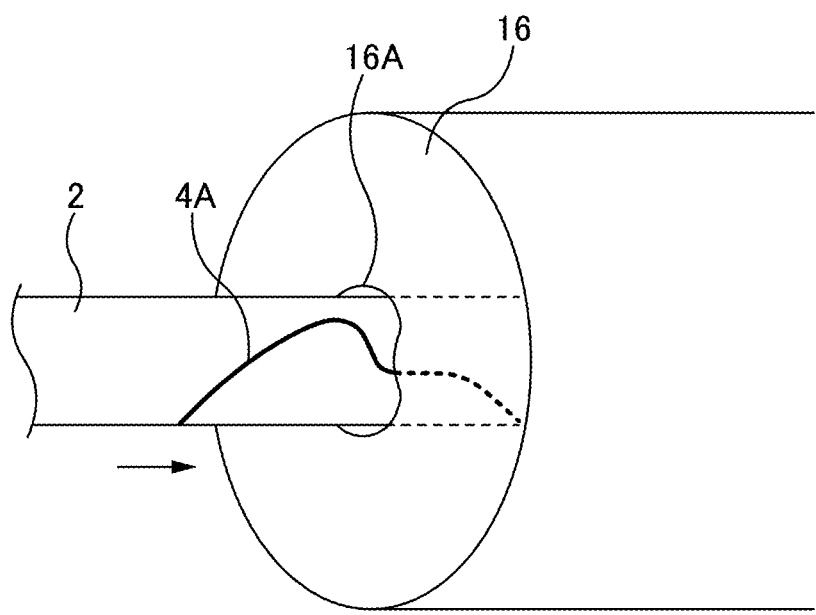

FIGS. 11A and 11B are explanatory diagrams of an "untwisting" occurring mechanism. A specific optical fiber 4A in the optical fiber unit 2 is illustrated by a black heavy line in the drawings.

When the plurality of optical fibers 4A twisted in an SZ manner are passed through the guide hole 16A of a shape extending in the Y-direction, the plurality of optical fibers 4A are squeezed by the guide hole 16A. It should be noted that, although the plurality of optical fibers 4A are squeezed at the entrance of the guide hole 16A in the drawings, an area in which the optical fibers are squeezed may be any area in the guide hole 16A. When the plurality of optical fibers 4A are squeezed by the guide hole 16A, the optical fibers 4A are untwisted in such an area of being squeezed, resulting in occurrence of an area where a twist of the optical fibers 4A does not exist. Further, on the upstream side from the squeezed area, the strain of the optical fibers 4A is gradually accumulated. Since the plurality of optical fibers 4A are twisted in an SZ manner, the area where strain is accumulated is drawn into the guide hole 16A when the direction of twist of the optical fibers 4A is reversed, resulting in occurrence of an area of abrupt meandering, as illustrated in FIG. 10B. The "untwisting" occurring mechanism is considered to be caused by such a reason.

The "untwisting" occurring mechanism is considered to be caused by the plurality of optical fibers 4A being squeezed by the guide hole 16A, as described above. Thus, in the case where the plurality of optical fibers 4A are twisted in an SZ manner, as the cross-sectional shape of the guide hole 16A is made more circular, "untwisting" becomes less likely to occur, and as the cross-sectional shape of the guide hole 16A is made longer in the longitudinal direction, "untwisting" becomes more likely to occur. In other words, as the cross-sectional shape of the housing portion 6A in the optical cable 1 to be manufactured is made more circular, "untwisting" becomes less likely to occur, and as the cross-sectional shape of the housing portion 6A in the optical cable 1 is made longer in the longitudinal direction, "untwisting" becomes more likely to occur.

As described above, if the cross-sectional shape of the housing portion 6A in the optical cable 1 is made excessively longer in the longitudinal direction, "untwisting" is more likely to occur, resulting in deterioration in transmission characteristics of the optical fibers 4A. Thus, in order to maintain transmission characteristics of the optical fibers 4A, there is a limitation in increasing a dimension L2 in the Y-direction relative to a dimension L1 in the X-direction in the cross-sectional shape of the housing portion 6A.

In the case where the cross-sectional shape of the housing portion 6A is an elliptical shape as in a first embodiment, it is desirable that L1/L2 is equal to or greater than 0.55. Further, in the case where the cross-sectional shape of the housing portion 6A is a truck shape as in a second embodiment, it is desirable that L1/L2 is equal to or greater than 0.60. Further, in the case where the cross-sectional shape of the housing portion 6A is a narrowed shape as in a third embodiment, it is desirable that L1/L2 is equal to or greater than 0.75. As long as it is within these ranges, deterioration in transmission characteristics can be restrained, even if the plurality of optical fibers 4A are twisted in an SZ manner.

It should be noted that, in the case where the plurality of optical fibers 4A are twisted in an SZ manner, an area of abrupt meandering is created as illustrated in FIG. 10B, since there is an area where the direction of twist of the optical fibers 4A is reversed. On the other hand, in the case where the plurality of optical fibers 4A are twisted in a single direction, such a phenomenon does not occur, since there is not such an area in which the direction of the twist of the optical fibers 4A is reversed.

Thus, it is advantageous to use the plurality of optical fibers 4A twisted in a single direction, since deterioration in transmission characteristics of the optical fibers 4A is not likely to be caused.

EXAMPLE

First Example

The optical cable 1 is manufactured such that the optical fiber unit 2 having 144 optical fibers (12 optical fibers×12 pieces) is configured using the intermittently fixed type optical fiber tape 4 having 12 cores. Glass FRP (GFRP) having a diameter of 1.7 mm is used as the strength members 7, and medium density polyethylene is covered as the sheath 6. The optical fibers 4A are twisted in an SZ manner at a pitch of 500 mm.

In the optical cable 1 in a first example, the housing portion 6A is formed in an elliptical shape, and the optical cable 1 having a configuration illustrated in FIG. 1 is manufactured. In the optical cable 1 of a first example, L1/L2 is 0.80, where L1 is a dimension in the X-direction (minor axis) of the housing portion 6A and L2 is a dimension in the Y-direction (major axis) thereof.

In an optical cable in a comparative example, assuming that the housing portion 6A is circular (L1/L2 is 1), an optical cable having a configuration illustrated in FIG. 3B (or FIG. 4B) is manufactured.

A cladding thickness of 0.6 mm is secured around the strength members 7, resulting in an outer diameter of 9.9 mm of the optical cable in a comparative example. Whereas, the optical cable 1 of a first example results in an outer diameter of 9.5 mm. That is, in a first example, it can be achieved to decrease the diameter by 0.4 mm while a cladding thickness around the strength members 7 is being secured.

Further, in an optical cable of a comparative example, the cladding thickness on the rip cords 8 is 2.5 mm. Whereas, in the optical cable 1 of a first example, the cladding thickness on the rip cords 8 is 2.0 mm. That is, in a first example, it can be achieved to decrease the cladding thickness on the rip cords 8 by 0.5 mm. It should be noted that the decrease in the cladding thickness on the rip cords 8 by 0.5 mm in a first example exceeds an effect obtained from decrease in the diameter of the optical cable 1 (the decrease in the diameter by 0.4 mm as described above).

Second Example

Next, the optical cables 1 including the housing portions 6A having cross-sectional shapes of an elliptical shape, a truck shape, and a narrowed shape, respectively, are manufactured. Further, with respect to each type of the optical cables 1, the optical cables 1 with rate R (=L1/L2) of L1 relative to L2 different by 0.05 each in a range of 0.45 to 0.90 are manufactured, where L1 is a dimension in the X-direction of the housing portion 6A and L2 is a dimension in the Y-direction thereof. It should be noted that all the optical cables 1 are set such that the cross-sectional area of the housing portion 6A is 13.1 mm². In the case where the cross-sectional shape of the housing portion 6A is in a truck shape, the cross-sectional area of the housing portion 6A is set at 13.1 mm² while the radius of curvature of the curved portions 62 is set at 1.25 mm. In the case where the cross-sectional shape of the housing portion 6A is in a narrowed shape, with respect to rate R (=L1/L2) in manufacturing, actual dimensions L1' (mm), L2' (mm) are set, as given in the following expressions, with the actual rate (=L1'/L2') being different by substantially 0.05 each, as illustrated in Table 1.

$$L1' = 3.36 \times R + 0.8464$$

$$L2' = -1.31 \times R + 5.4803$$

TABLE 1

(ACTUAL SIZE AND RATE IN THE CASE OF NARROWED SHAPE)

| R = L1/L2 | L1' (mm) | L2' (mm) | L1'/L2' | CROSS-SECTIONAL AREA (mm²) | EXTERNAL DIAMETER (mm) |
|---|---|---|---|---|---|
| 0.90 | 3.87 | 4.30 | 0.900 | 13.1 | 9.47 |
| 0.85 | 3.70 | 4.37 | 0.848 | 13.1 | 9.30 |
| 0.80 | 3.53 | 4.43 | 0.797 | 13.1 | 9.13 |

TABLE 1-continued (ACTUAL SIZE AND RATE IN THE CASE OF NARROWED SHAPE)

| R = L1/L2 | L1' (mm) | L2' (mm) | L1'/L2' | CROSS-SECTIONAL AREA (mm²) | EXTERNAL DIAMETER (mm) |
|---|---|---|---|---|---|
| 0.75 | 3.37 | 4.50 | 0.748 | 13.1 | 8.97 |
| 0.70 | 3.20 | 4.56 | 0.701 | 13.1 | 8.80 |
| 0.65 | 3.03 | 4.63 | 0.655 | 13.1 | 8.63 |
| 0.60 | 2.86 | 4.69 | 0.610 | 13.1 | 8.46 |
| 0.55 | 2.69 | 4.76 | 0.566 | 13.1 | 8.29 |
| 0.50 | 2.53 | 4.83 | 0.524 | 13.1 | 8.13 |
| 0.45 | 2.36 | 4.89 | 0.482 | 13.1 | 7.96 |

Further, also in a second example, similarly to a first example, glass FRP (GFRP) having a diameter of 1.7 mm is used as the strength members 7, and medium density polyethylene is covered as the sheath 6, thereby securing a cladding thickness of 0.6 mm around the strength members 7. The optical fibers 4A are twisted in an SZ manner at a pitch of 500 mm.

As a method of evaluating these optical cables 1, transmission loss and the presence or absence of regional loss (drop loss) are measured by the OTDR, with each of the optical cables 1 having a length of 1000 m.

Figure 12A:
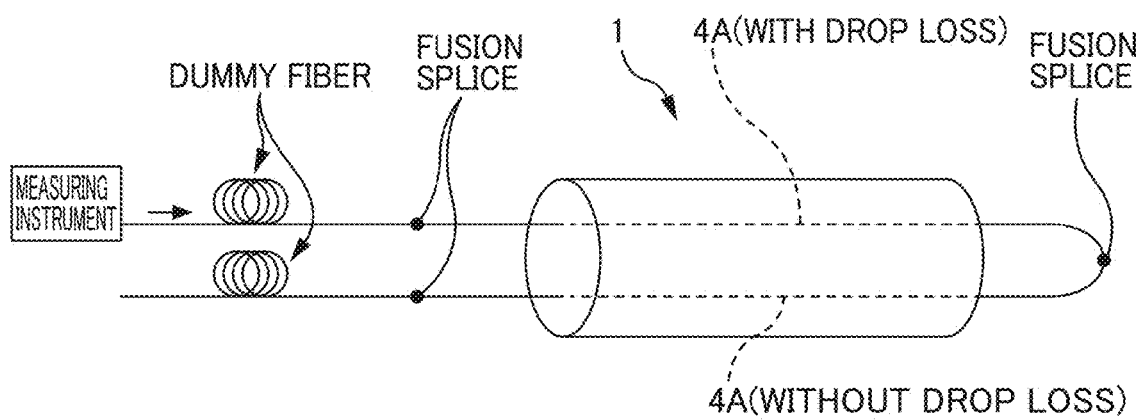
FIG. 12A is an explanatory diagram of OTDR measurement.

FIG. 12A is an explanatory diagram of OTDR measurement. Measuring equipment (OTDR) is connected to a dummy fiber, and this dummy fiber is fusion spliced to the first optical fiber 4A which is to be measured in the optical cable 1. Further, the first optical fiber 4A and the second optical fiber 4A which are to be measured are fusion spliced to each other, and the other end of the second optical fiber 4A is fusion spliced to a dummy fiber. Thereby, transmission loss and the presence or absence of drop loss in the two optical fibers 4A can concurrently be evaluated at one measurement.

Figure 12B:
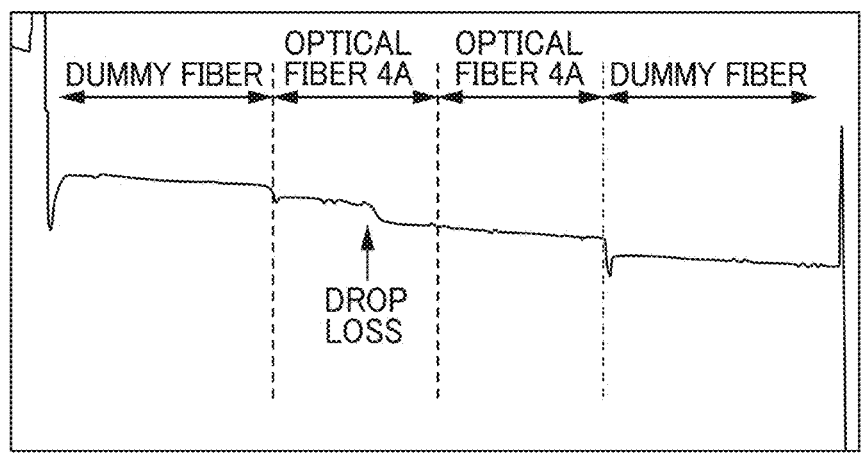
FIG. 12B is an explanatory diagram of a measurement result.

FIG. 12B illustrates an example of such measurement results. In this measurement result, it can be verified that a drop loss is found in the first optical fiber 4A. Further, it can be verified that the optical fiber 4A (first optical fiber 4A) with a drop loss has a larger transmission loss than the optical fiber 4A (second optical fiber 4A) without a drop loss. Accordingly, transmission loss and the presence or absence of drop loss in the optical fibers 4A included in the optical cable 1 are evaluated.

It should be noted that the maximum value of the transmission loss among all the optical fibers 4A configuring the optical cable 1 is given as a transmission loss. Evaluation results will be given in Table 2 as follows. The numerical values in the table indicate transmission losses, and the thick frames in the table each indicate the optical cable 1 in which a drop loss is found.

TABLE 2

[dB/km]

| RATE | CROSS-SECTIONAL SHAPE | | |
|---|---|---|---|
| R = L1/L2 | ELLIPTICAL | TRACK | NARROWED |
| 0.90 | 0.20 | 0.20 | 0.21 |
| 0.85 | 0.20 | 0.20 | 0.21 |
| 0.80 | 0.20 | 0.20 | 0.21 |
| 0.75 | 0.20 | 0.20 | 0.23 |
| 0.70 | 0.20 | 0.20 | 0.36 |
| 0.65 | 0.21 | 0.23 | 0.46 |
| 0.60 | 0.23 | 0.24 | 0.71 |
| 0.55 | 0.24 | 0.55 | 0.66 |
| 0.50 | 0.64 | 0.78 | 1.26 |
| 0.45 | 0.63 | 0.84 | 1.00 |

As described in the evaluation results in Table 2, in the case where the cross-sectional shape of the housing portion 6A is in an elliptical shape, when L1/L2 becomes equal to or smaller than 0.50, a drop loss occurs, and a transmission loss abruptly increases. It should be noted that a drop loss is considered to be caused by regional bending of the optical fiber 4A that occurs due to "untwisting". From these results, it has been confirmed that L1/L2 equal to or greater than 0.55 is desirable in the case where the cross-sectional shape of the housing portion 6A is elliptical.

Further, in the case where the cross-sectional shape of the housing portion 6A is in a truck shape, when L1/L2 becomes equal to or smaller than 0.55, a drop loss occurs and a transmission loss abruptly increases. From these results, it has been confirmed that L1/L2 equal to or greater than 0.60 is desirable in the case where the cross-sectional shape of the housing portion 6A is in a truck shape.

Further, in the case where the cross-sectional shape of the housing portion 6A is in a narrowed shape, when L1/L2 becomes equal to or smaller than 0.70, a drop loss occurs and a transmission loss abruptly increases. From these results, it has been confirmed that L1/L2 equal to or greater than 0.75 is desirable, in the case where the cross-sectional shape of the housing portion 6A is in a narrowed shape.

It should be noted that it is confirmed that, in the case where the cross-sectional shape of the housing portion 6A is in a narrowed shape, a drop loss is more likely to occur than in the cases of an elliptical shape and a truck shape. This is considered to be due to the fact that the cross-sectional shape of the guide hole 16A of the nipple 16 used in manufacturing the optical fibers 4A is in a narrowed shape, and the optical fibers 4A are squeezed at such an narrowed part of the guide hole 16A, and thus the strain of the optical fibers 4A is likely to be accumulated when the optical cable 1 is being manufactured.

Incidentally, as illustrated in a first example, in the case where the cross-sectional shape of the housing portion 6A is in an elliptical shape, the optical cable 1 with L1/L2 of 0.80 has an outer diameter of 9.5 mm. Whereas, in the case where the cross-sectional shape of the housing portion 6A is in a narrowed shape, the optical cable 1 with L1/L2 of 0.80 has an outer diameter of 9.13 mm (see Table 1). Thus, in the case where the cross-sectional shape of the housing portion 6A is in a narrowed shape, it can be confirmed that such an effect of being able to make the optical cable 1 thinner than in the case of an elliptical shape can be obtained. It should be noted that this effect itself can be obtained also by the optical cable 1 without rip cords.

===Other===

The above embodiments are intended to facilitate the understanding of the present invention but not to limit the invention. And it is needless to say that modifications and improvements of the present invention are possible without departing from the scope of the invention, and equivalents thereof are also encompassed by the invention.

<Regarding Housing Portion 6A>

In the above described embodiments, the cross-sectional shape of the housing portion 6A is in an elliptical shape, a track shape, or a narrowed shape. However, the cross-sectional shape of the housing portion 6A is not limited to these shapes. For example, the cross-sectional shape of the housing portion 6A may be rectangular, polygonal (for example, hexagonal, octagonal, etc.).

<Regarding Optical Cable 1>

In the above embodiments, only the strength members 7 and the rip cords 8 are disposed within the sheath 6, however, another member different from the strength members 7 and the rip cords 8 may be disposed within the sheath 6.

Further, in the above embodiments, a plurality of optical fibers is wrapped with the press-wrapping tape 5, however, the press-wrapping tape 5 may not be provided. For example, a forming pipe made of low density polyethylene can be disposed in place of the press-wrapping tape 5.

<Regarding Rip Cords 8>

In the above embodiments, the optical cable 1 includes a pair of the rip cords 8. However, the number of the rip cords 8 is not limited to two. For example, the optical cable 1 may include four or six rip cords. In this case, it is preferable that any two of the rip cords 8 are disposed in the Y-direction when viewed from the housing portion 6A (a direction in which the sheath 6 is thinner: a direction intersecting the direction for connecting the two strength members 7 in a cross section of the optical cable 1.)

<Regarding Arrangement of Rip Cords 8 1>

In embodiments described above, a pair of the rip cords 8 is disposed in the direction orthogonal to the direction (the X-direction) of connecting the two strength members 7 sandwiching the housing portion 6A. However, the arrangement of the rip cords 8 is not limited to the direction orthogonal to the X-direction.

Figure 13:
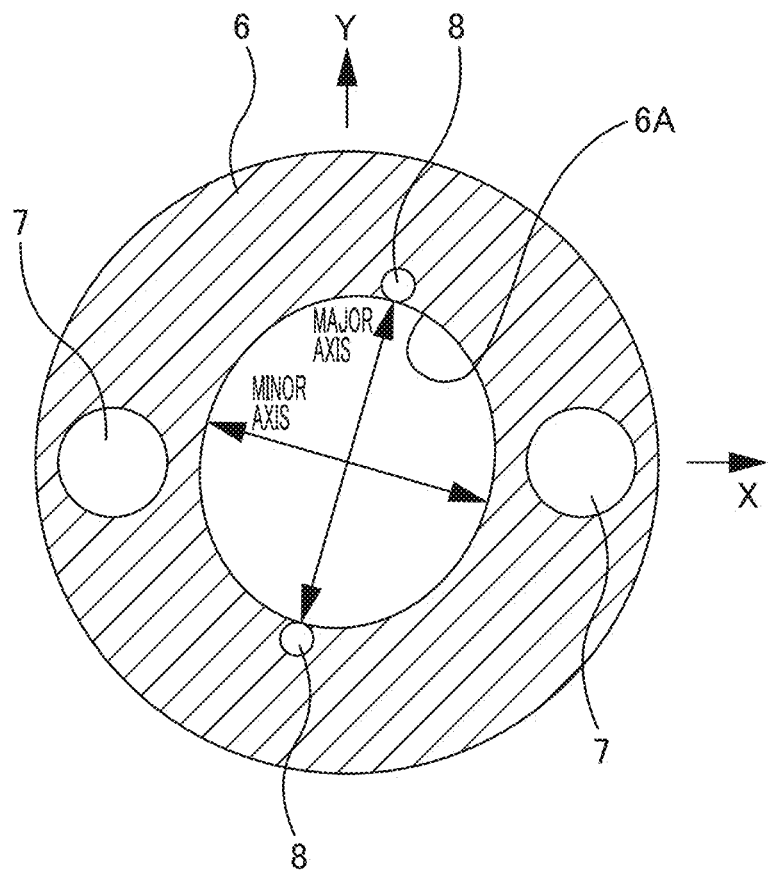
FIG. 13 is a cross-sectional view of another embodiment in the case where a housing portion 6A has an elliptical shape in cross section.

FIG. 13 is a cross-sectional view of another embodiment in the case where the cross-sectional shape of the housing portion 6A is an elliptical shape. Here, it is illustrated in a state with the optical fiber unit 2 omitted. The minor axis of the housing portion 6A of an elliptical shape is inclined relative to the direction (X-direction) of connecting the two strength members 7 sandwiching the housing portion 6A. The two rip cords 8 are disposed to sandwich the housing portion 6A of an elliptical shape from the major axis direction. Thus, the direction for connecting the two rip cords 8 is not orthogonal to the direction for connecting the two strength members 7 sandwiching the housing portion 6A.

Also in an embodiment illustrated in FIG. 13, since a dimension of the housing portion 6A in the direction (corresponding to the first direction) of connecting the two strength members 7 is smaller, an optical cable can be made thinner. Further, since a dimension of the housing portion 6A in the direction (corresponding to the second direction) of connecting the two rip cords 8 is greater, the cladding thickness on the rip cords 8 (dimension(s) from the rip cord(s) 8 to the outer peripheral surface of the sheath 6) can be reduced. However, since a dimension in the X-direction of the housing portion 6A is increased, as compared with that in the optical cable 1 in the first embodiment, the optical cable is slightly thickened.

<Regarding Arrangement of Rip Cords 8 2>

In an embodiment described above, a pair of the rip cords 8 is disposed in such a manner as to sandwich the housing portion 6A from the direction in which the housing portion 6A extends. In other words, a pair of the rip cords 8 is disposed in such a manner as to sandwich the housing portion 6A from a direction in which a dimension of the housing portion 6A is the greatest. However, the arrangement of the rip cords 8 is not limited thereto.

Figure 14A:
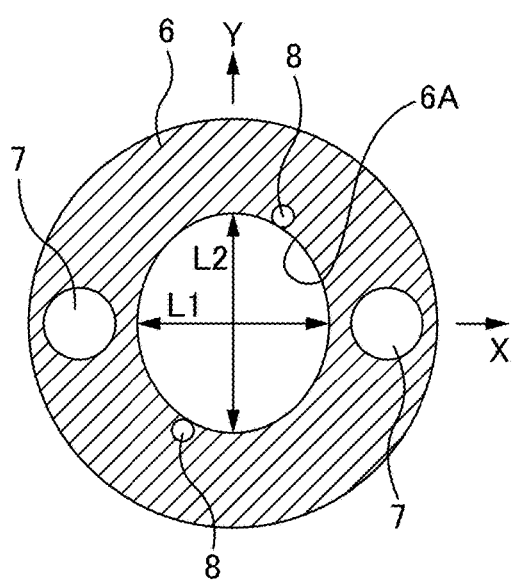
FIGS. 14A and 14B are cross-sectional views of still other embodiments.
Figure 14B:
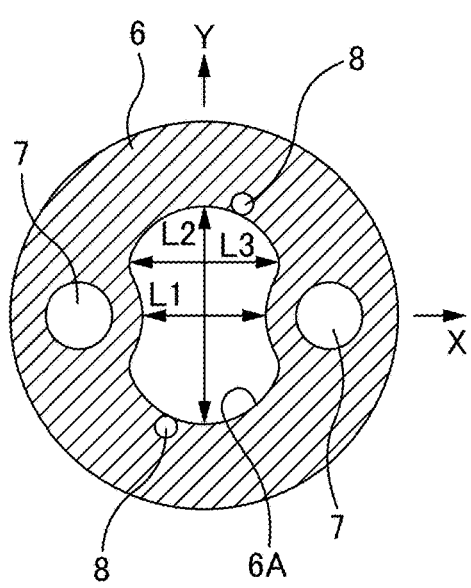

FIGS. 14A and 14B are cross-sectional views of further different embodiments. As illustrated in FIG. 14A, even in the case where the cross-sectional shape of the housing portion 6A is in an elliptical shape, the two rip cords 8 may be disposed to sandwich the housing portion 6A from a direction different from the major axis direction. Further, as illustrated in FIG. 14B, even in the case where the cross-sectional shape of the housing portion 6A is in a narrowed shape, the rip cords may be disposed to sandwich the housing portion 6A from a direction different from the direction of the greatest dimension L2 of the housing portion 6A. Even in such a case, it is possible to reduce the cladding thickness on the rip cords 8 while the optical cable is made thinner.

It should be noted that, also in an embodiment illustrated in FIG. 14B, the housing portion 6A is in such a shape as to be concaved inwardly at a line connecting the two strength members 7 (on the neutral surface when the optical cable 1 is bent). Thus, the dimension L1 in the X-direction of the housing portion 6A on the line connecting the two strength members 7 can be reduced, resulting in an achievement of such an effect as to be able to make the optical cable 1 thinner.

<Regarding Strength Members 7>

Figure 15:
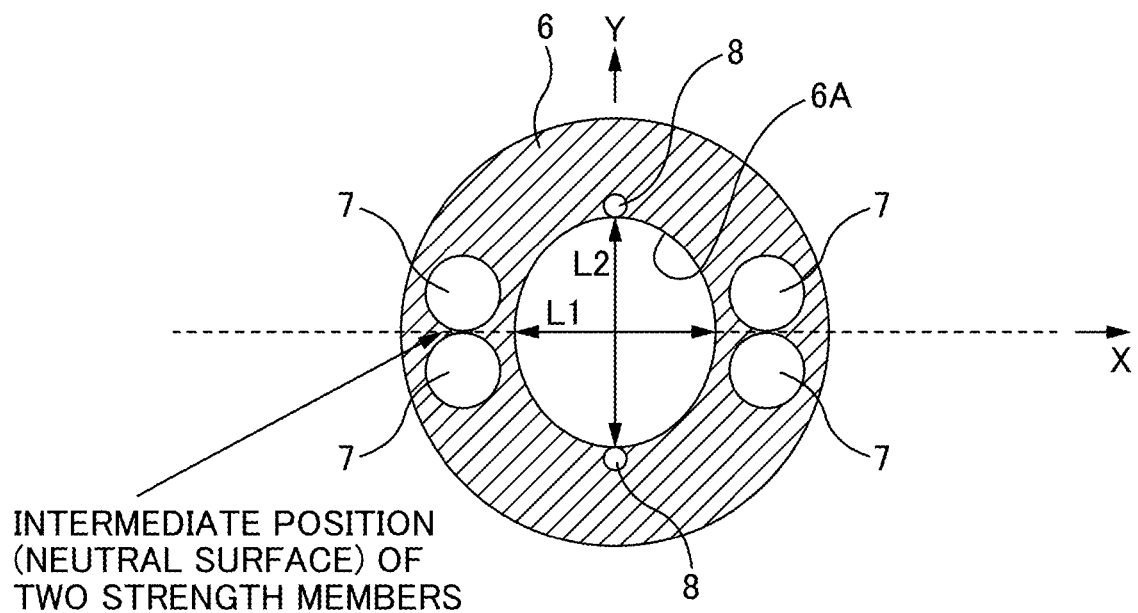
FIG. 15 is an explanatory diagram of an embodiment in which four strength members 7 are provided.

In embodiments described above, the optical cable 1 includes a pair of the strength members 7. However, the number of the strength members 7 is not limited to two. For example, as illustrated in FIG. 15, the optical cable 1 may include four of the strength members 7. Also in this case, a pair of the strength members 7 is embedded within the sheath 6 in such a manner as to sandwich the housing portion 6A. When a direction for connecting a pair of the strength members 7 sandwiching the housing portion 6A is in the X-direction, a dimension L1 in the X-direction of the housing portion 6A is smaller, thereby being able to make an optical cable thinner (it should be noted that the direction for connecting the two strength members disposed up and down is not in the X-direction, since the two strength members 7 disposed up and down in the drawing do not sandwich the housing portion 6A). Further, the direction for connecting the two rip cords 8 is in a direction intersecting the X-direction, and since the dimension L2 in this direction of the housing portion 6A is greater, the cladding thickness on the rip cords 8 (dimension(s) from the rip cord(s) 8 to the outer peripheral surface of the sheath 6) can be reduced.

It should be noted that, in the case of FIG. 15, the neutral surface when the optical cable 1 is bent is a surface to connect between the intermediate position of two strength members disposed up and down on one side and the other intermediate position thereof on the other side, the strength members on one and the other sides sandwiching the housing portion 6A. In other words, the X-direction is the direction for connecting between the intermediate position of the two strength members disposed up and down on one side and the other intermediate position of the two strength members on the other side, the strength members on one and the other sides sandwiching the housing portion 6A.

REFERENCE SIGNS LIST

1 optical cable, 2 optical fiber unit,
4 optical fiber tape, 4A optical fiber, 4B connecting portion,
5 press-wrapping tape, 6 sheath,
6A housing portion, 61 straight portion, 62 curved portion,
7 strength member, 8 rip cord,
12 collector, 14 extruder,
16 nipple, 16A guide hole, 18 die

The invention claimed is:

1. An optical cable comprising:
an optical fiber unit including a plurality of optical fibers;
a sheath configured to house the optical fiber unit in a housing portion, the sheath having a circular external form;
a pair of strength members embedded in the sheath sandwiching the housing portion, each strength member constituting said pair of strength members including at least one strength member; and
two rip cords, wherein
when a direction of connecting the pair of strength members sandwiching the housing portion is a first direction, and a direction intersecting the first direction is a second direction, in any cross section of the optical cable in a longitudinal direction,
a cross-sectional shape of the housing portion has a dimension in the second direction greater than a dimension in the first direction,
the two rip cords are disposed to sandwich the optical fiber unit such that a direction of connecting the two rip cords is in the second direction, in any cross section of the optical cable in the longitudinal direction,
the plurality of optical fibers are twisted in an SZ manner,
the cross-sectional shape of the housing portion is an elliptical shape with a minor axis and a major axis, and
L1/L2 is equal to or greater than 0.55, where L1 is the length of the minor axis and L2 is the length of the major axis.

2. An optical cable comprising:
an optical unit including a plurality of optical fibers;
a sheath configured to house the optical fiber unit in a housing portion, the sheath having a circular external form;
a pair of strength members embedded in the sheath sandwiching the housing portion, each strength member constituting said pair of strength members including at least one strength member; and
two rip cords, wherein
when a direction of connecting the pair of strength members sandwiching the housing portion in a first direction, and a direction intersecting the first direction is a second direction, in any cross section of the optical cable in a longitudinal direction,
a cross-sectional shape of the housing portion has a dimension in the second direction greater than a dimension in the first direction,
the two rip cords are disposed to sandwich the optical fiber unit such that a direction of connecting the two rip cords is in the second direction, in any cross section of the optical cable in the longitudinal direction,
the cross-sectional shape of the housing portion is in such a shape as to be enclosed by two straight portions along the second direction and two arc-shaped portions on both sides in the second direction of the straight portions, the plurality of optical fibers are twisted in an SZ manner, and L1/L2 is equal to or greater than 0.60, where L1 is a dimension of the housing portion in the first direction and L2 is a dimension thereof in the second direction.

3. An optical cable comprising:

an optical fiber unit including a plurality of optical fibers;

a sheath configured to house the optical fiber unit in a housing portion, the sheath having a circular external form;

a pair of strength members embedded in the sheath sandwiching the housing portion, each strength member constituting said pair of strength members including at least one strength member; and two rip cords, wherein when a direction of connecting the pair of strength members sandwiching the housing portion in a first direction, and a direction intersecting the first direction is a second direction, in any cross section of the optical cable in a longitudinal direction, a cross-sectional shape of the housing portion has a dimension in the second direction greater than a dimension in the first direction, the two rip cords are disposed to sandwich the optical fiber unit such that a direction of connecting the two rip cords is in the second direction, in any cross section of the optical cable in the longitudinal direction, the cross-sectional shape of the housing portion is in such a shape as to be narrowed at a line connecting the two strength members, the plurality of optical fibers are twisted in an SZ manner, and L1/L2 is equal to or greater than 0.75, where L1 is a dimension of the housing portion in the first direction and L2 is a dimension thereof in the second direction.

4. The optical cable according to claim 3, wherein the strength members are made of a nonmetallic material, and the cross-sectional shape of the housing portion is in such a shape as to be enclosed by two straight portions along the second direction and two arc-shaped portions on both sides in the second direction of the straight portions.

* * * * *